US009516075B2

(12) United States Patent
Okuyama et al.

(10) Patent No.: US 9,516,075 B2
(45) Date of Patent: Dec. 6, 2016

(54) APPARATUS, SYSTEM, AND METHOD OF MANAGING DATA, AND RECORDING MEDIUM

(71) Applicants: Taro Okuyama, Tokyo (JP); Yoshiko Aono, Kanagawa (JP)

(72) Inventors: Taro Okuyama, Tokyo (JP); Yoshiko Aono, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 135 days.

(21) Appl. No.: 14/483,575

(22) Filed: Sep. 11, 2014

(65) Prior Publication Data
US 2015/0081789 A1    Mar. 19, 2015

(30) Foreign Application Priority Data

Sep. 13, 2013 (JP) .................................. 2013-190838

(51) Int. Cl.
*H04L 29/06* (2006.01)
*H04M 3/56* (2006.01)
(Continued)

(52) U.S. Cl.
CPC ......... *H04L 65/403* (2013.01); *H04L 12/1818* (2013.01); *H04L 45/74* (2013.01);
(Continued)

(58) Field of Classification Search
CPC .... H04L 12/1818; H04L 45/74; H04L 65/403; H04L 67/10; H04L 67/141; H04L 1/274583; H04L 3/563; H04L 2201/36; H04L 2250/60; H04L 7/152
See application file for complete search history.

(56) References Cited

U.S. PATENT DOCUMENTS

2002/0109770 A1* 8/2002 Terada ................. H04M 3/567
                                                       348/14.08
2003/0195018 A1  10/2003 Lee
(Continued)

FOREIGN PATENT DOCUMENTS

EP    2 627 035 A1    8/2013
JP    5-153356         6/1993
(Continued)

OTHER PUBLICATIONS

U.S. Appl. No. 14/478,021, filed Sep. 5, 2014.
Extended European Search Report issued Mar. 3, 2015 in Patent Application No. 14184001.7.

*Primary Examiner* — Brian J Gillis
*Assistant Examiner* — Gil H. Lee
(74) *Attorney, Agent, or Firm* — Oblon, McClelland, Maier & Neustadt, L.L.P.

(57) ABSTRACT

A transmission terminal includes: a memory to store, for each one of a plurality of candidate counterpart terminals that the transmission terminal is capable of communicating, address information indicating at least a location of the candidate counterpart terminal on a network; a user interface to receive a user input of address information of a counterpart terminal, and a communication start request that requests to start communication with the counterpart terminal; a processing circuitry to store the address information of the counterpart terminal received at the user interface in the memory, to register the counterpart terminal as a candidate counterpart terminal for the terminal; and a transmitter to send a request to start communication with the counterpart terminal using the address information of the counterpart terminal that is received at the user interface.

7 Claims, 12 Drawing Sheets

| REGISTRATION NO. | IP ADDRESS | NAME |
|---|---|---|
| 1 | 1.2.1.4 | Mr. Ricoh, General Manager |
| 2 | 1.2.1.5 | Ms. Nabeta |
| 3 | | INPUT NAME AND START COMMUNICATION (UNREGISTERED) |
| 4 | | INPUT NAME AND START COMMUNICATION (UNREGISTERED) |

(51) Int. Cl.
    *H04L 12/741*    (2013.01)
    *H04L 29/08*     (2006.01)
    *H04N 7/15*      (2006.01)
    *H04L 12/18*     (2006.01)
    *H04M 1/2745*    (2006.01)

(52) U.S. Cl.
    CPC ............ *H04L 67/10* (2013.01); *H04L 67/141* (2013.01); *H04M 3/563* (2013.01); *H04N 7/152* (2013.01); *H04M 1/274583* (2013.01); *H04M 2201/36* (2013.01); *H04M 2250/60* (2013.01)

(56) References Cited

U.S. PATENT DOCUMENTS

| | | | | |
|---|---|---|---|---|
| 2005/0013289 | A1* | 1/2005 | Tanimoto | H04L 29/06 370/352 |
| 2010/0164685 | A1* | 7/2010 | Pering | G10L 17/00 340/5.83 |
| 2012/0326962 | A1* | 12/2012 | Asai | H04N 1/00474 345/156 |
| 2013/0210400 | A1 | 8/2013 | Rhee et al. | |
| 2014/0280469 | A1* | 9/2014 | Messer | H04L 67/42 709/203 |

FOREIGN PATENT DOCUMENTS

| | | |
|---|---|---|
| JP | 2000-078628 | 3/2000 |
| JP | 2004-147136 | 5/2004 |
| JP | 2013-085208 | 5/2013 |

\* cited by examiner

FIG. 8

| IP ADDRESS | COUNTERPART NAME | REGISTRATION NO. |
|---|---|---|
| 1.2.1.4 | Mr. Ricoh, General Manager | 1 |
| 1.2.1.5 | Ms. Nabeta | 2 |

FIG. 9

| TERMINAL ID | PASSWORD |
|---|---|
| 01aa | aaaa |
| 01ab | abab |
| 01ba | baba |
| ... | ... |

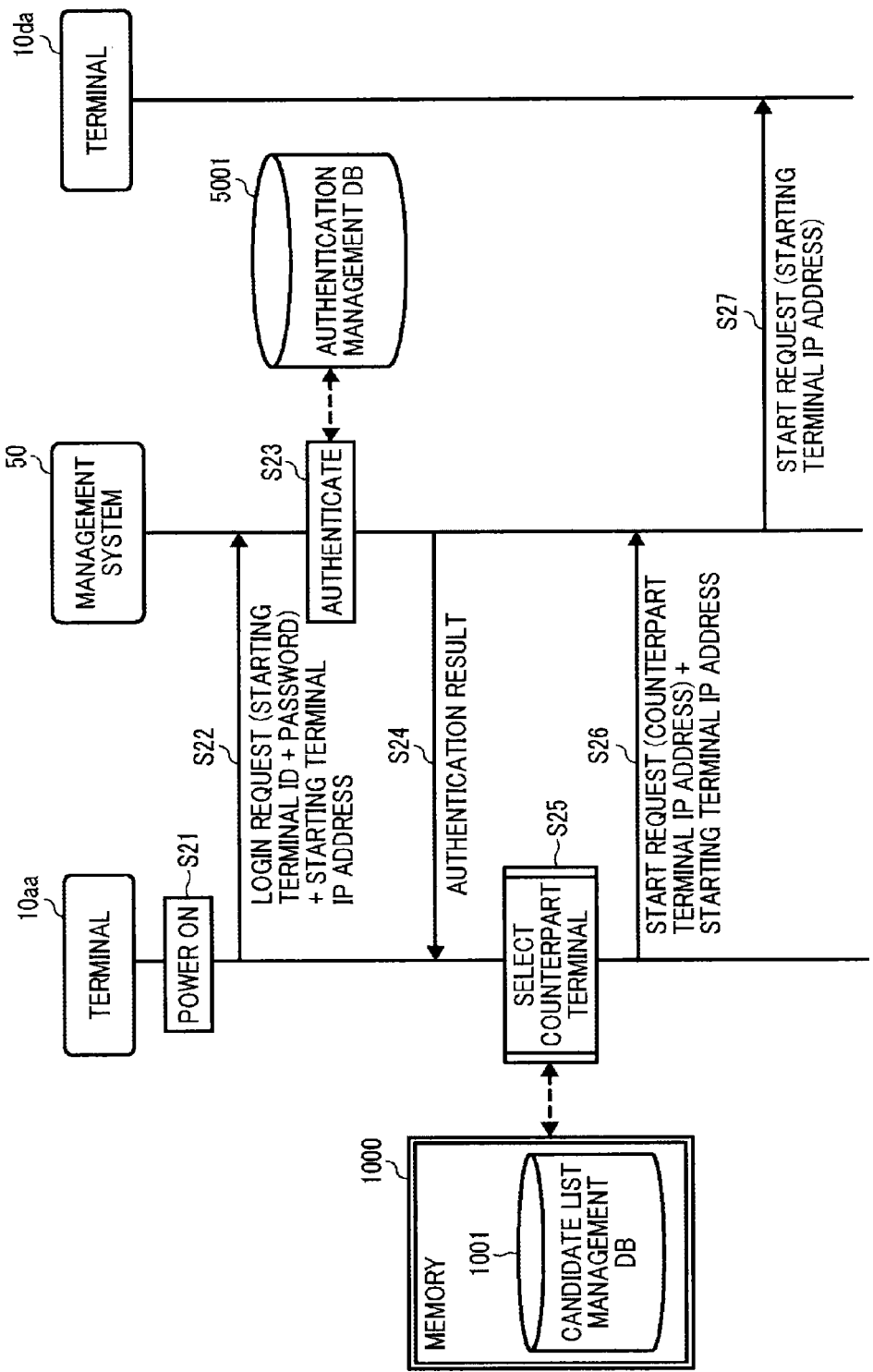

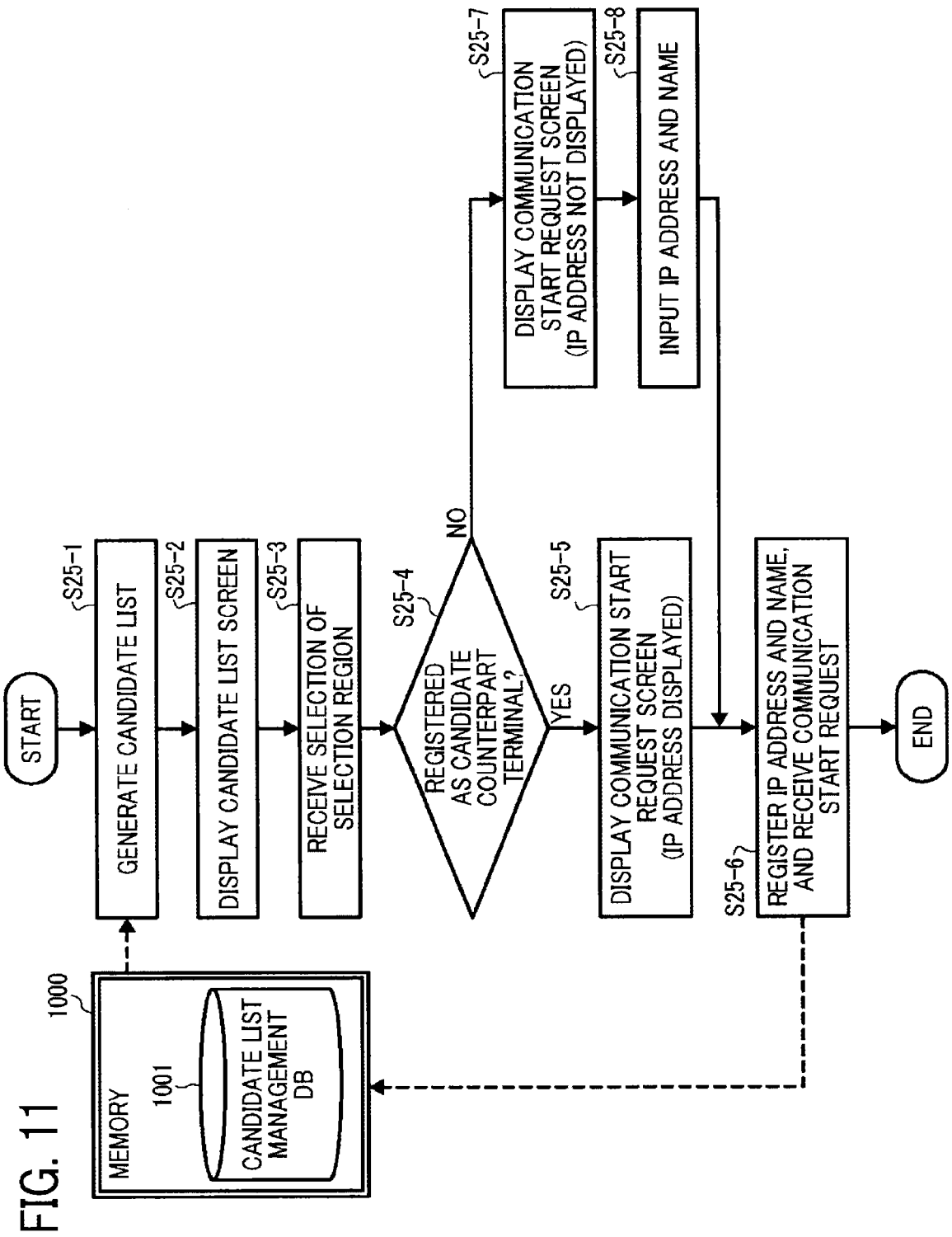

FIG. 12

| REGISTRATION NO. | IP ADDRESS | NAME |
|---|---|---|
| 1 | 1.2.1.4 | Mr. Ricoh, General Manager |
| 2 | 1.2.1.5 | Ms. Nabeta |
| 3 | INPUT NAME AND START COMMUNICATION (UNREGISTERED) | |
| 4 | INPUT NAME AND START COMMUNICATION (UNREGISTERED) | |

FIG. 13

REGISTER COUNTERPART TERMINAL AND START COMMUNICATION

COUTERPART TERMINAL IP ADDRESS (REQUIRED): 1.3.2.3

COUNTERPART TERMINAL NAME (OPTIONAL): President

REGISTER CANDIDATE COUNTERPART TERMINAL, START COMMUNICATION

CANCEL

FIG. 14

| IP ADDRESS | COUNTERPART NAME | REGISTRATION NO. |
|---|---|---|
| 1.2.1.4 | Mr. Ricoh, General Manager | 1 |
| 1.2.1.5 | Ms. Nabeta | 2 |
| 1.3.2.3 | President | 3 |

FIG. 15

| REGISTRATION NO. | IP ADDRESS | NAME |
|---|---|---|
| 1 | 1.2.1.4 | Mr. Ricoh, General Manager |
| 2 | 1.2.1.5 | Ms. Nabeta |
| 3 | 1.3.2.3 | President |
| 4 | INPUT NAME AND START COMMUNICATION (UNREGISTERED) | |

APPARATUS, SYSTEM, AND METHOD OF MANAGING DATA, AND RECORDING MEDIUM

CROSS-REFERENCE TO RELATED APPLICATIONS

This patent application is based on and claims priority pursuant to 35 U.S.C. §119(a) to Japanese Patent Application No. 2013-190838, filed on Sep. 13, 2013, in the Japan Patent Office, the entire disclosure of which is hereby incorporated by reference herein.

BACKGROUND

Technical Field

The present invention relates to managing transmission terminals.

Description of the Related Art

Transmission systems that perform a videoconference or the like via a communication network such as the Internet have become popular in recent years due to a demand for reducing business trip costs and time. When communication is started between a plurality of transmission terminals in such a communication system, image data and sound data are transmitted/received, thereby realizing a videoconference.

In order to make it easier for a user to select a desired counterpart terminal from among candidate counterpart terminals for communication, the user may be caused to select a desired counterpart terminal from a candidate list being displayed for a starting terminal that starts communication (see JP-2006-074453-A).

SUMMARY

While the candidate list can make easier for the user to select a counterpart terminal, the user needs to register the candidate counterpart terminal before starting communication. In the case where the user wants to start communication with a candidate counterpart terminal that is not registered in the candidate list, the user enters the IP address or terminal ID of the counterpart terminal. However, the next time the user wants to start communication again with the above-mentioned new candidate counterpart terminal, it is necessary for the user to re-enter the IP address or the IP address again, unless the user registers the new candidate counterpart terminal in the candidate list. Thus, it has been inconvenient for some users to start communication with a candidate counterpart terminal that is not registered in the candidate list.

In view of the above, a transmission terminal receives a request for starting communication with a counterpart terminal from a user, which includes counterpart terminal address information input by the user. In response to receiving the request, the terminal stores the counterpart terminal address information of the counterpart terminal to update candidate counterpart terminal identification for the terminal.

For example, the transmission terminal includes: a memory to store, for each one of a plurality of candidate counterpart terminals that the transmission terminal is capable of communicating, address information indicating at least a location of the candidate counterpart terminal on a network; a user interface to receive a user input of address information of a counterpart terminal, and a communication start request that requests to start communication with the counterpart terminal; a processing circuitry to store the address information of the counterpart terminal received at the user interface in the memory, to register the counterpart terminal as a candidate counterpart terminal for the terminal; and a transmitter to send a request to start communication with the counterpart terminal using the address information of the counterpart terminal that is received at the user interface.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 8 is a conceptual diagram illustrating a candidate list management table;

FIG. 9 is a conceptual diagram illustrating an authentication management table;

FIG. 10 is a data sequence diagram illustrating operation of preparing to start communication between transmission terminals;

FIG. 11 is a flowchart illustrating operation of accepting selection of a counterpart terminal;

FIG. 12 is an illustration of an example candidate list screen;

FIG. 13 is an illustration of an example communication start acceptance screen;

FIG. 14 is a conceptual diagram illustrating the candidate list management table, which is updated through the operation of FIG. 11; and FIG. 15 is an illustration of an example candidate list screen.

Figure 1:
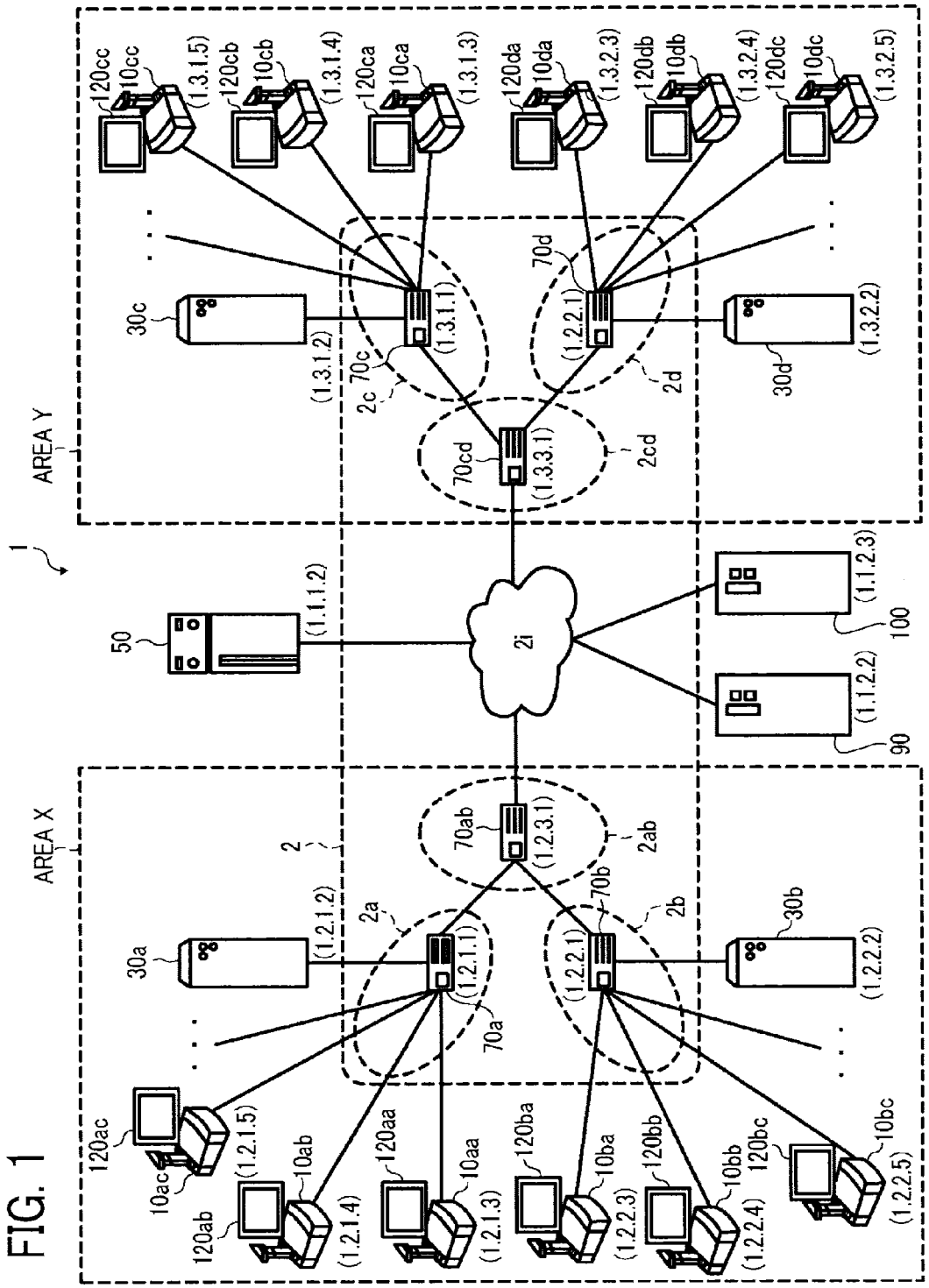
FIG. 1 is a schematic diagram of a transmission system according to an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Hereinafter, an embodiment of the present invention will be described referring to the drawings.

[Overall Configuration]

Figure 2:
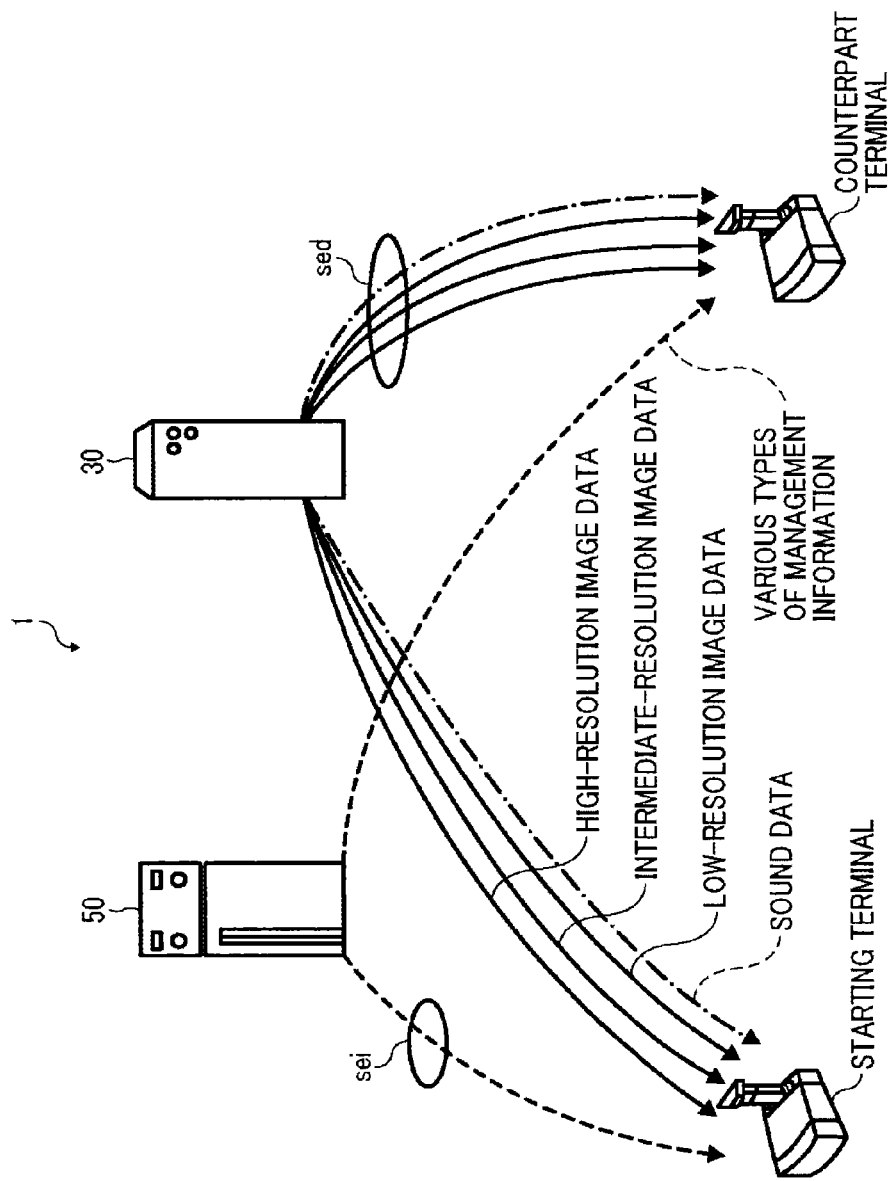
FIG. 2 is a conceptual diagram illustrating a transmission/reception of image data, sound data, and various types of management information in the transmission system of FIG. 1.
Figure 3:
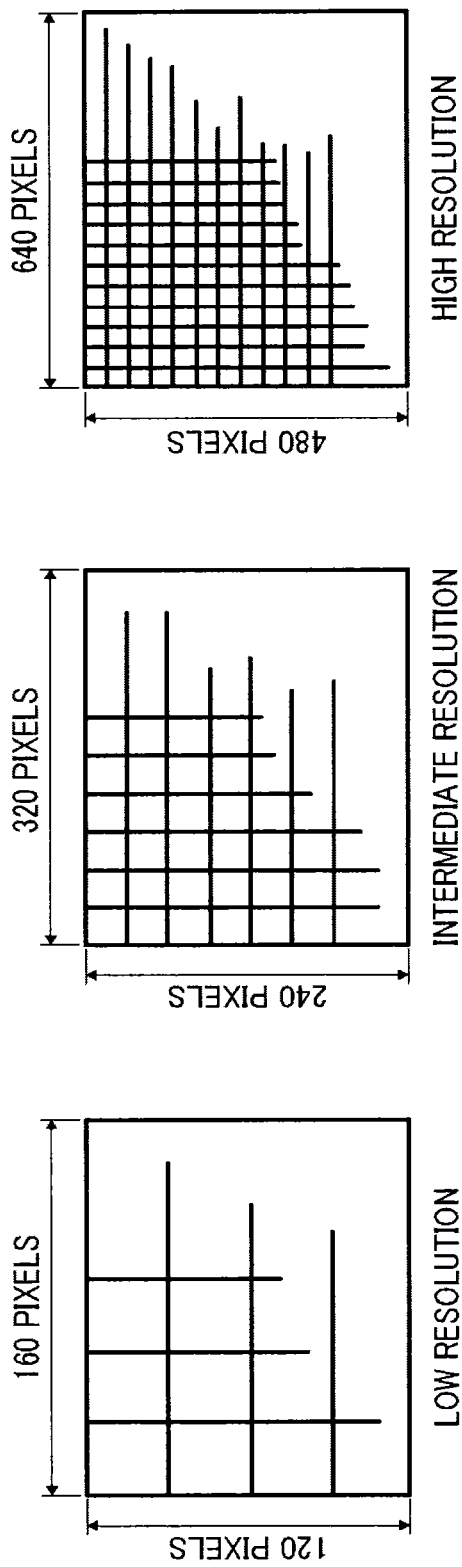
FIGS. 3A to 3C are conceptual diagrams describing the image quality of image data.

FIG. 1 is a schematic diagram of a transmission system according to the embodiment of the present invention. FIG. 2 is a conceptual diagram illustrating a transmission/reception of image data, sound data, and various types of management information in the transmission system. FIGS. 3A to 3C are conceptual diagrams describing the image quality of image data.

The transmission system 1 includes a communication system that intercommunicates information, feelings, or the like between a plurality terminals. The communication system is a system for intercommunicating information, feelings, or the like between a plurality of communication terminals (corresponding to "transmission terminals" in the embodiment) via a communication management system (corresponding to a "transmission management system" in the embodiment), and examples thereof include a teleconference system and a video conference system.

The transmission system 1 illustrated in FIG. 1 includes a plurality of transmission terminals (10aa, 10ab, . . . ), displays (120aa, 120ab, . . . ) for the individual transmission terminals (10aa, 10ab, . . . ), a plurality of relay devices (30a, 30b, 30c, and 30d), a transmission management system 50, a program providing system 90, and a maintenance system 100.

The plurality of transmission terminals 10 perform transmission by transmitting and receiving image data and sound data serving as examples of content data.

Hereinafter, the "transmission terminal" may simply be represented as the "terminal". In addition, an arbitrary one or ones of the plurality of terminals (10aa, 10ab, . . . ) is/are represented as a "terminal(s) 10". An arbitrary one or ones of the plurality of displays (120aa, 120ab, . . . ) is/are represented as a "display(s) 120". An arbitrary one or ones of the plurality of relay devices (30a, 30b, 30c, and 30d) is/are represented as a "relay device(s) 30". Further, a terminal serving as a request sender that gives a request to start a videoconference is represented as a "starting terminal", and a terminal serving as a counterpart terminal (relay destination) that is a request destination is represented as a "counterpart terminal".

In addition, as illustrated in FIG. 2, a management information session sei for transmitting and receiving various types of management information is established via the transmission management system 50 between a starting terminal and a counterpart terminal in the transmission system 1. In addition, four sessions for transmitting and receiving four items of data, namely, high-resolution image data (HL), intermediate-resolution image data (ML), low-resolution image data (L), and sound data (V), are established via a relay device 30 between the starting terminal and the counterpart terminal. Here, these four sessions are collectively indicated as an image/sound data session sed.

Here, the resolution of images of image data handled in the embodiment will be described. There are the following images: a low-resolution image, serving as a base image, having horizontal 160 pixels by vertical 120 pixels, as illustrated in FIG. 3A; an intermediate-resolution image having horizontal 320 pixels by vertical 240 pixels, as illustrated in FIG. 3B; and a high-resolution image having horizontal 640 pixels by vertical 480 pixels, as illustrated in FIG. 3C. In the case of communicating via a narrow band, low-quality image data that only includes low-resolution image data serving as a base image is relayed. In the case of communicating a relatively wide band, intermediate-quality image data including low-resolution image data serving as a base image and intermediate-resolution image data is relayed. In addition, in the case of communicating via a very wide band, high-quality image data including low-resolution image data serving as a base image, intermediate-resolution image data, and high-resolution image data is relayed.

The relay devices 30 illustrated in FIG. 1 relay content data between the plurality of terminals 10. The transmission management system 50 collectively manages login authentication from the terminals 10, the communication states, candidate lists, and so forth of the terminals 10, and the communication states and so forth of the relay devices 30. Note that an image of image data may be a moving image or a still image, or may include both thereof.

A plurality of routers (70a, 70b, 70c, 70d, 70ab, and 70cd) select an optimal path for image data and sound data. Hereinafter, an arbitrary one or ones of the routers (70a, 70b, 70c, 70d, 70ab, and 70cd) is/are represented as a "router(s) 70".

The program providing system 90 includes a hard disk (HD) 204 described later. The HD 204 stores a terminal program for causing a terminal 10 to realize various functions (or for causing a terminal 10 to function as various elements), and the terminal program can be transmitted to the terminal 10. In addition, the HD 204 of the program providing system 90 stores a relay device program for causing a relay device 30 to realize various functions (or for causing a relay device 30 to function as various elements), and the relay device program can be transmitted to the relay device 30. Further, the HD 204 of the program providing system 90 stores a transmission management program for causing the transmission management system 50 to realize various functions (or for causing the transmission management system 50 to function as various elements), and the transmission management program can be transmitted to the transmission management system 50.

The maintenance system 100 is one or more computers for performing maintenance, management, or conservation of at least one of the terminals 10, the relay devices 30, the transmission management system 50, and the program providing system 90. For example, in the case where the maintenance system 100 is located in one country, and the terminals 10, the relay devices 30, the transmission management system 50, or the program providing system 90 is/are located outside that country, the maintenance system 100 remotely performs, via a communication network 2, maintenance, management, or conservation of at least one of the terminals 10, the relay devices 30, the transmission management system 50, and the program providing system 90. In addition, the maintenance system 100 performs maintenance such as management of the modal number, serial number, sales contact, maintenance checkup, or a past history of failures of at least one of the terminals 10, the relay devices 30, the transmission management system 50, and the program providing system 90 without having the communication network 2 therebetween.

In this example, the terminals (10*aa*, 10*ab*, 10*ac*, . . . ), the relay device 30*a*, and the router 70*a* are connected to be communicable with each other by a local area network (LAN) 2*a*. The terminals (10*ba*, 10*bb*, 10*bc*, . . . ), the relay device 30*b*, and the router 70*b* are connected to be communicable with each other by a LAN 2*b*. In addition, the LAN 2*a* and the LAN 2*b* are connected to be communicable with each other by a dedicated line 2*ab* including the router 70*ab* and are configured in a certain area A. For example, the area A is Japan, the LAN 2*a* is configured in an office in Tokyo, and the LAN 2*b* is configured in an office in Osaka.

Further, in this example, the terminals (10*ca*, 10*cb*, 10*cc*, . . . ), the relay device 30*c*, and the router 70*c* are connected to be communicable with each other by a LAN 2*c*. The terminals (10*da*, 10*db*, 10*dc*, . . . ), the relay device 30*d*, and the router 70*d* are connected to be communicable with each other by a LAN 2*d*. In addition, the LAN 2*c* and the LAN 2*d* are connected to be communicable with each other by a dedicated line 2*cd* including the router 70*cd* and are configured in a certain area B. For example, the area B is the United States, the LAN 2*c* is configured in an office in New York, and the LAN 2*d* is configured in an office in Washington D.C. The area A and the area B are connected to be communicable with each other from the routers (70*ab* and 70*cd*), respectively, via the Internet 2*i*.

In addition, the transmission management system 50 and the program providing system 90 are connected to be communicable with the terminals 10 and the relay devices 30 via the Internet 2*i*. The transmission management system 50 and the program providing system 90 may be located in the area A or the area B, or may be located in other areas.

In the embodiment, the communication network 2 of the embodiment includes the LAN 2*a*, the LAN 2*b*, the dedicated line 2*ab*, the Internet 2*i*, the dedicated line 2*cd*, the LAN 2*c*, and the LAN 2*d*. The communication network 2 may include not only a wired network, but also a network where communication is performed wirelessly, such as Wireless Fidelity (WiFi) or Bluetooth (registered trademark).

In addition in FIG. 1, four digits indicated below each of the terminals 10, each of the relay devices 30, the transmission management system 50, each of the routers 70, and the program providing system 90 indicates an IP address in an abbreviated form in the general Internet Protocol version 4 (IPv4). For example, the IP address of the terminal 10*aa* is "1.2.1.3". Although IPv6 may be used instead of IPv4, IPv4 is used in order to make the description simple.

Note that the terminals 10 may be used not only for communication between different offices or for communication between different rooms in the same office, but also for communication within the same room or for outdoor-indoor communication or outdoor-outdoor communication. In the case where the terminals 10 are used outside, wireless communication using a cellular phone communication network or the like is performed.

<Hardware Configuration>

Figure 4:
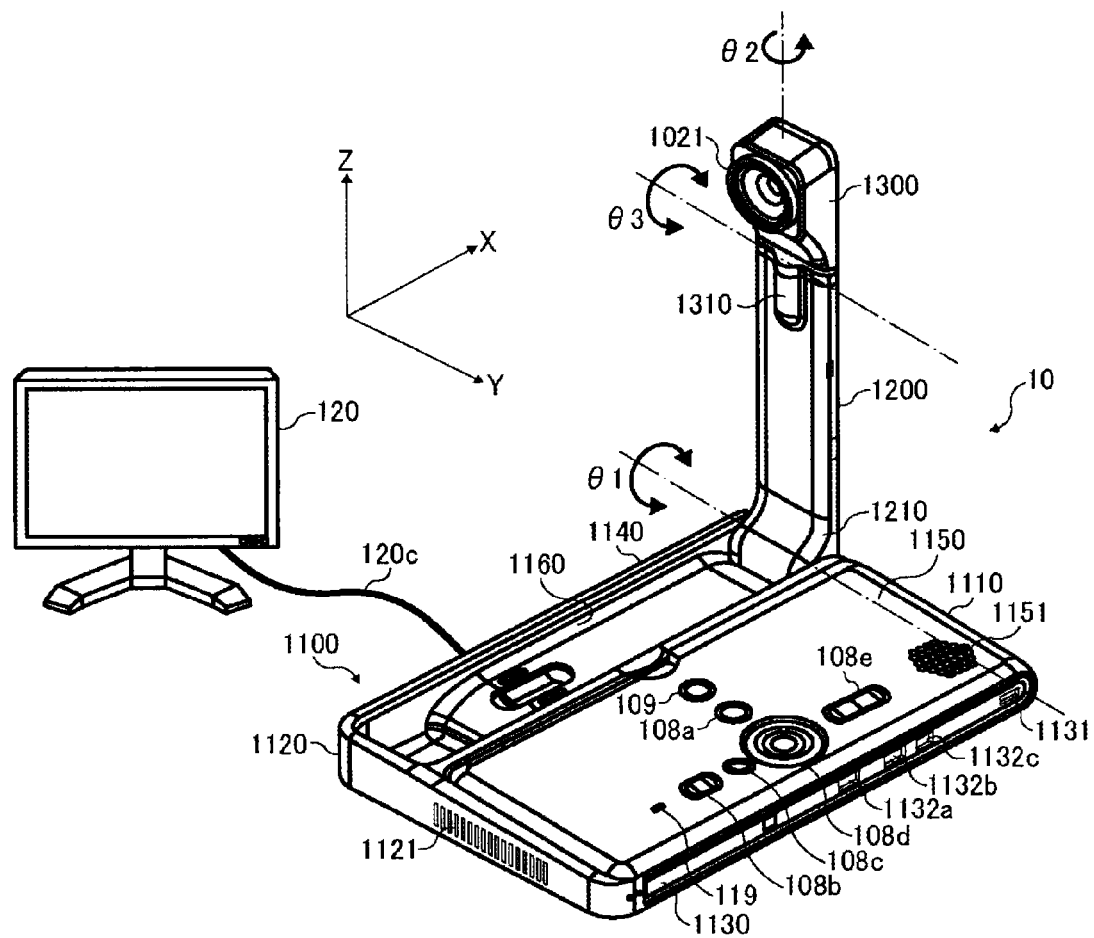
FIG. 4 is an external view of a transmission terminal of the transmission system of FIG. 1.

Next, the hardware configuration of the embodiment will be described. FIG. 4 is an external view of a terminal 10 according to the embodiment. The description will be given assuming that the longitudinal direction of the terminal 10 is the X-axis direction, a direction orthogonal to the X-axis direction on one plane is the Y-axis direction, and a direction orthogonal to the X-axis direction and the Y-axis direction (vertical direction) is the Z-axis direction.

As illustrated in FIG. 4, the terminal 10 includes a casing 1100, an arm 1200, and a camera housing 1300. Among these portions, a front wall 1110 of the casing 1100 has an inlet face including a plurality of inlet holes, and a back wall 1120 of the casing 1100 has an exhaust face 1121 on which a plurality of exhaust holes are formed. Accordingly, by driving of a cooling fan included in the casing 1100, air behind the terminal 10 can be taken in via the inlet face and exhausted to the rear of the terminal 10 via the exhaust face 1121. A right-side wall 1130 of the casing 1100 has a sound pickup hole 1131 formed thereon, and a built-in microphone 114, described later, is capable of picking up sound and noise.

An operation panel 1150 is formed toward the right-side wall 1130 of the casing 1100. The operation panel 1150 has a plurality of operation keys (108*a* to 108*e*) described later, a power switch 109 described later, and an alarm lamp 119 described later, which are formed thereon. In addition, the operation panel 1150 has a sound output face 1151 formed thereon, which is formed of a plurality of sound output holes for allowing output sound from a built-in speaker 115 described later to pass through. In addition, an accommodation portion 1160 serving as a recess for accommodating the arm 1200 and the camera housing 1300 is formed toward a left-side wall 1140 of the casing 1100. A plurality of connection ports (1132*a* to 1132*c*) for electrically connecting cables to an external device connection interface (I/F) 118 described later are provided on the right-side wall 1130 of the casing 1100. In contrast, a connection port for electrically connecting a cable 120*c* for a display 120 to the external device connection I/F 118 described later is provided on the left-side wall 1140 of the casing 1100.

The following description uses the term "operation key(s) 108" for indicating an arbitrary one or ones of the operation keys (108*a* to 108*e*), and the term "connection port(s) 1132" for indicating an arbitrary one or ones of the connection ports (1132*a* to 1132*c*).

Next, the arm 1200 is attached to the casing 1100 via a torque hinge 1210 and is configured to be rotatable in the vertical direction within the range of a tilt angle θ1 of 135 degrees with respect to the casing 1100. FIG. 4 indicates a state in which the tilt angle θ1 is 90 degrees.

The camera housing 1300 has a built-in camera 112 provided thereon, which will be described later, and the camera 112 can capture an image of a user, a document, a room, or the like. In addition, the camera housing 1300 has a torque hinge 1310 formed thereon. The camera housing 1300 is attached to the arm 1200 via the torque hinge 1310 and is configured to be rotatable in the vertical and horizontal directions within a range of a pan angle θ2 of ±180 degrees and a tilt angle θ3 of ±45 degrees with respect to the arm 1200, in which the state illustrated in FIG. 4 serves as 0 degrees.

Since the relay devices 30, the transmission management system 50, the program providing system 90, and the maintenance system 100 each have the same appearance as that of a general server computer, descriptions of the appearances thereof are omitted.

Figure 5:
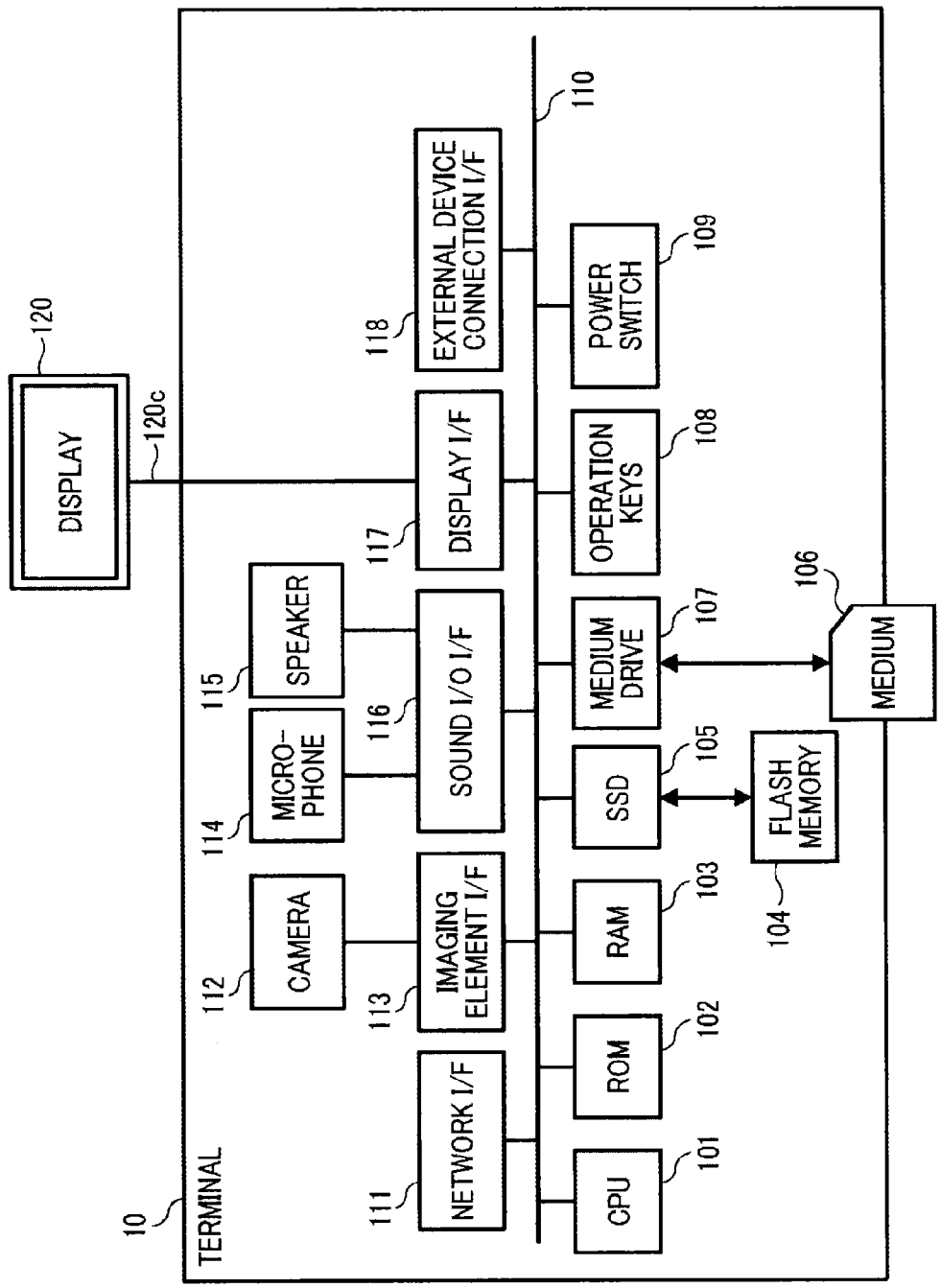
FIG. 5 is a hardware configuration diagram of the transmission terminal of FIG. 4.

FIG. 5 is a hardware configuration diagram of the terminal 10 according to the embodiment of the present invention. As illustrated in FIG. 5, the terminal 10 of the embodiment includes a central processing unit (CPU) 101 that controls the overall operation of the terminal 10, a read-only memory (ROM) 102 that stores a program used for controlling the CPU 101, such as an initial program loader (IPL), a random-access memory (RAM) 103 used as a work area for the CPU 101, a flash memory 104 that stores various types of data, such as the terminal program, image data, and sound data, a solid state drive (SSD) 105 that controls reading/writing of various types of data from/to the flash memory 104 under control of the CPU 101, a medium drive 107 that controls reading/writing (storage) of data from/to a recording medium 106 such as a flash memory, the operation keys 108 operated in the case of, for example, selecting a counterpart terminal for the terminal 10, the power switch 109 for turning on/off the power of the terminal 10, and a network interface (I/F) 111 for transmitting data using the communication network 2.

In addition, the terminal 10 includes the built-in camera 112, which captures an image of a subject and obtains image data under control of the CPU 101, an imaging element I/F 113 that controls driving of the camera 112, the built-in microphone 114, which receives a sound input, the built-in speaker 115, which outputs sound, a sound input/output I/F 116 that processes inputting/outputting of a sound signal between the microphone 114 and the speaker 115 under control of the CPU 101, a display I/F 117 that transmits image data to an external display 120 under control of the CPU 101, the external device connection I/F 118 connected to a connection port 1021g illustrated in FIG. 4 in order to connect various external devices, the alarm lamp 119, which indicates an abnormality of various functions of the terminal 10, and a bus line 110 such as an address bus and a data bus for electrically connecting the above-described elements as illustrated in FIG. 5.

The display 120 is a display element formed of liquid crystal or organic electroluminescence (EL) that displays an image of a subject, an operation icon, or the like. In addition, the display 120 is connected to the display I/F 117 by the cable 120c. The cable 120c may be an analog red green blue (RGB) (video graphic array (VGA)) signal cable, a component video cable, a high-definition multimedia interface (HDMI) signal cable, or a digital video interactive (DVI) signal cable.

The camera 112 includes a lens and a solid-state imaging element that converts an image (video) of a subject to electronic data by converting light to electric charge. As the solid-state imaging element, for example, a complementary metal-oxide-semiconductor (CMOS) or a charge-coupled device (CCD) is used.

The external device connection I/F 118 is capable of connecting an external device such as an external camera, an external microphone, or an external speaker by using a Universal Serial Bus (USB) cable or the like. In the case where an external camera is connected, the external camera is driven in preference to the built-in camera 112 under control of the CPU 101. Similarly, in the case where an external microphone is connected or an external speaker is connected, the external microphone or the external speaker is driven in preference to the built-in microphone 114 or the built-in speaker 115 under control of the CPU 101.

Note that the recording medium 106 is configured to be removable from the terminal 10. In addition, a non-volatile memory that reads or writes data under control of the CPU 101 is not limited to the flash memory 104, and an electrically erasable and programmable read-only memory (EEPROM) may be used instead.

Further, the terminal program may be stored in a file in an installable format or an executable format on a computer-readable recording medium such as the recording medium 106 and circulated. In addition, the terminal program may be stored on the ROM 102, instead of the flash memory 104.

Figure 6:
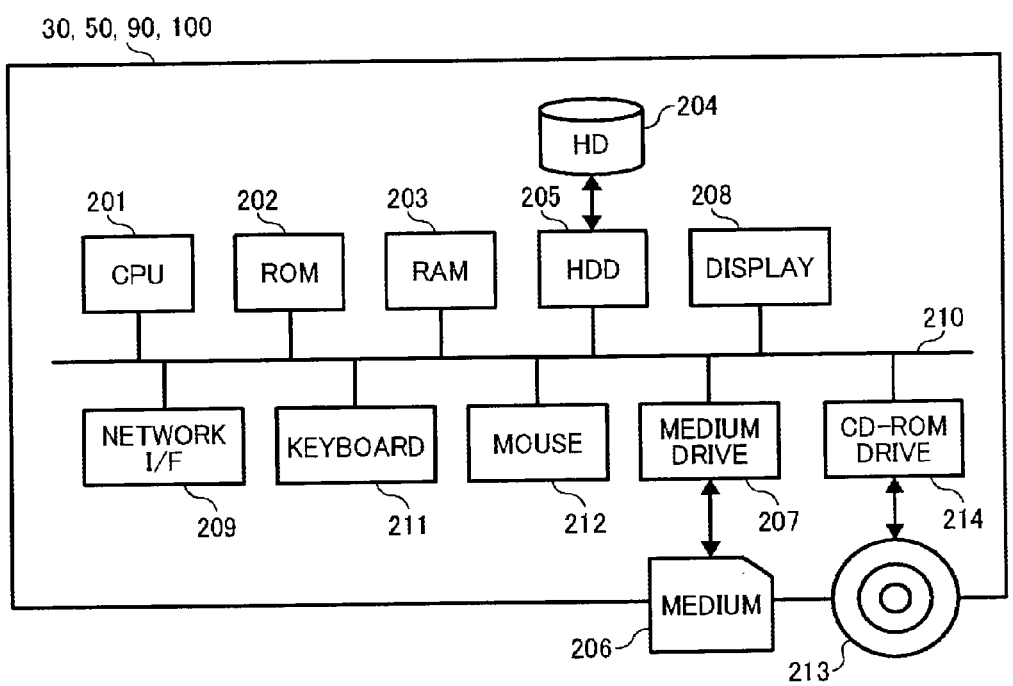
FIG. 6 is a hardware configuration diagram of a relay device, a transmission management system, a program providing system, and a maintenance system of the transmission system of FIG. 1.

FIG. 6 is a hardware configuration diagram of any one of the relay device 30, the transmission management system 50, the program providing system 90, and the maintenance system 100. Here, the description will be given by using the configuration of the transmission management system 50.

The transmission management system 50 includes a CPU 201 that controls the overall operation of the transmission management system 50, a ROM 202 that stores a program used for controlling the CPU 201, such as an IPL, a RAM 203 used as a work area for the CPU 201, the HD 204, which stores various types of data, such as the transmission management program, a hard disk drive (HDD) 205 that controls reading/writing of various types of data from/to the HD 204 under control of the CPU 201, a medium drive 207 that controls reading/writing (storage) of data from/to a recording medium 206 such as a flash memory, a display 208 that displays various types of information such as a cursor, a menu, a window, characters, or an image, a network I/F 209 for transmitting data using the communication network 2, a keyboard 211 including a plurality of keys for entering characters, numerals, and various instructions, a mouse 212 that selects and executes various instructions, selects a processing target, and moves the cursor, a compact disc read-only memory (CD-ROM) drive 214 that controls reading/writing of various types of data from/to a CD-ROM 213 serving as an example of a removable recording medium, and a bus line 210 such as an address bus and a data bus for electrically connecting the above-described elements as illustrated in FIG. 6.

Note that the transmission management program may be stored in a file in an installable format or an executable format on a computer-readable recording medium such as the recording medium 206 or the CD-ROM 213 and distributed. In addition, the transmission management program may be stored on the ROM 202, instead of the HD 204.

In addition, since the relay devices 30 have a hardware configuration that is the same as or similar to that of the above-described transmission management system 50, a description thereof is omitted. Note that the HD 204 stores a relay device program for controlling the relay devices 30. Also in this case, the relay device program may be recorded in a file in an installable format or an executable format on a computer-readable recording medium such as the recording medium 206 or the CD-ROM 213 and distributed. In addition, the relay device program may be stored on the ROM 202, instead of the HD 204.

In addition, since the program providing system 90 and the maintenance system 100 each have a hardware configuration that is the same as or similar to that of the above-described transmission management system 50, descriptions thereof are omitted. Note that the HD 204 stores a program providing program for controlling the program providing system 90. Also in this case, the program providing program may be recorded in a file in an installable format or an executable format on a computer-readable recording medium such as the recording medium 206 or the CD-ROM 213 and distributed. In addition, the program providing program may be stored on any desired memory such as the ROM 202, instead of the HD 204.

Note that each of the above-described programs may be recorded on a computer-readable recording medium such as a compact disc recordable (CD-R), a digital versatile disk (DVD), or a Blu-ray disk, which serve as other examples of the above-described removable recording medium, and may be provided.

<<Functional Configuration>>

Figure 7:
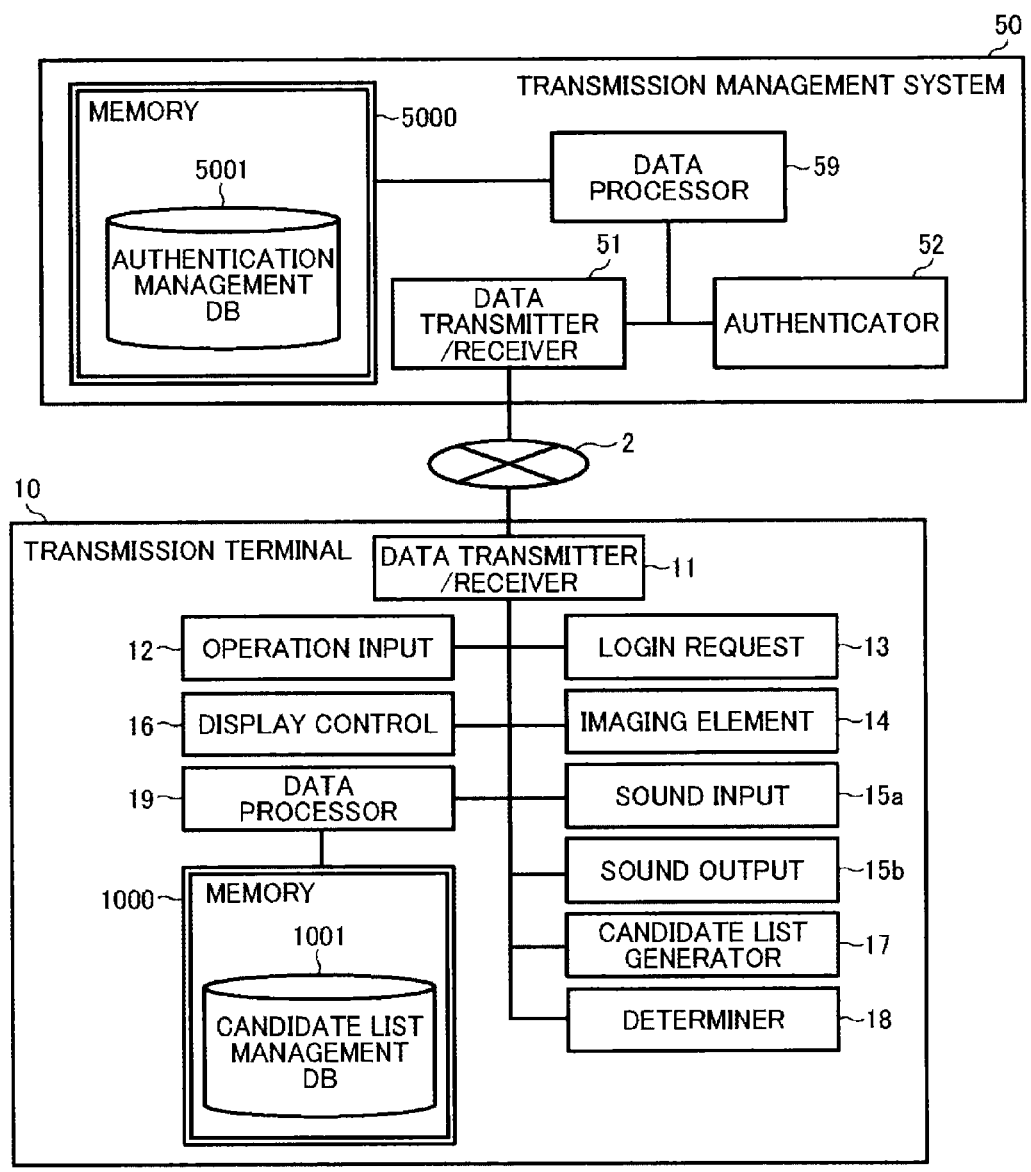
FIG. 7 is a functional block diagram of the transmission terminal and the transmission management system included in the transmission system of FIG. 1.

Next, the functional configuration of the embodiment of the present invention will be described. FIG. 7 is a functional block diagram of the transmission terminal and the transmission management system included in the transmission system 1 of the embodiment. In FIG. 7, the terminal 10 and the transmission management system 50 are connected to be capable of communicating data via the communication network 2. For descriptive purposes, the program providing system 90 is omitted in FIG. 7.

<Functional Configuration of Terminal>

The terminal 10 includes a data transmitter/receiver 11, an operation input (device) 12, a login request 13, an imaging element 14, a sound input 15a, a sound output 15b, a display control 16, a candidate list generator 17, a determiner 18, and a data processor 19. These elements are functions that are realized by or elements that are caused to function by any of the hardware structure illustrated in FIG. 5 that is/are caused to operate in response to a command from the CPU 101 in accordance with the terminal program expanded from the flash memory 104 to the RAM 103.

The terminal 10 further includes a memory 1000 configured by the flash memory 104 illustrated in FIG. 5. The memory 1000 stores counterpart terminal frame data of a frame (a portion other than each selection region described later) of a later-described candidate list screen illustrated in FIG. 12.

(Candidate List Management Table)

The memory 1000 further stores a candidate list management DB 1001, such as the candidate list management table of FIG. 8. The candidate list management table stores an IP address of a candidate counterpart terminal that is registered, a name of the candidate counterpart terminal, and a registration number, in association with one another. For example, the candidate list management table of FIG. 8 stores a record for a registered candidate counterpart terminal including the IP address "1.2.1.4", the name "Mr. Ricoh, general manager", and the registration number "1".

(Functional Configuration of Terminal)

Next, referring to FIGS. 5 and 7, the functional configuration of the terminal 10 is explained, according to an example embodiment of the present invention. In the following description of functional configuration of the terminal 10, among elements illustrated in FIG. 5, relationships with main elements for realizing functional configuration of the terminal 10 will be described.

The data transmitter/receiver 11 of the terminal 10 illustrated in FIG. 7 is realized by a command from the CPU 101 illustrated in FIG. 5 and by the network I/F 111 illustrated in FIG. 5, and performs transmission/reception of various types of data (or information) to/from another terminal, apparatus, or system via the communication network 2.

The operation input 12 is realized by a command from the CPU 101 illustrated in FIG. 5 and by the operation keys 108 and the power switch 109 illustrated in FIG. 5, and accepts various inputs or various selections from the user. For example, when the user turns on the power switch 109 illustrated in FIG. 5, the operation input 12 illustrated in FIG. 7 accepts the power on instruction and turns on the power.

The login request 13 is realized by a command from the CPU 101 illustrated in FIG. 5, and, in response to acceptance of the above-described power on instruction, transmits, from the data transmitter/receiver 11 to the transmission management system 50 via the communication network 2, a login request for requesting login authentication and a start request for starting communication.

The imaging element 14 is realized by a command from the CPU 101 illustrated in FIG. 5 and by the camera 112 and the imaging element I/F 113 illustrated in FIG. 5. The imaging element 14 captures an image of a subject and outputs image data obtained by capturing the image.

The sound input 15a is realized by a command from the CPU 101 illustrated in FIG. 5 and by the sound input/output I/F 116 illustrated in FIG. 5. After the sound of the user is converted to a sound signal by the microphone 114, the sound input 15a receives sound data according to this sound signal. The sound output 15b is realized by a command from the CPU 101 illustrated in FIG. 5 and by the sound input/output I/F 116 illustrated in FIG. 5, and outputs the sound signal according to the sound data to the speaker 115, and the speaker 115 outputs sound.

The display control 16 is realized by a command from the CPU 101 illustrated in FIG. 5 and by the display I/F 117 illustrated in FIG. 5, and performs control for transmitting image data to the external display 120.

The candidate list generator 17 generates and updates a candidate list screen such as that illustrated in FIG. 12 or 15, on the basis of later-described candidate list frame data and candidate list information (candidate list management table of FIG. 8), which are read from the memory 1000.

The determiner 18 determines whether an IP address, input by the user, is stored in the candidate list management DB 1001 to determine whether a counterpart terminal having the input IP address has been registered as a candidate counterpart terminal. In this example, the user may input the IP address, on a specific selection region selected from a plurality of selection regions of the candidate list screen of FIG. 12 or 15.

The data processor 19 is realized by a command from the CPU 101 illustrated in FIG. 5 and by the SSD 105 illustrated in FIG. 5, and performs processing to store various types of data in the memory 1000 or to read various types of data stored in the memory 1000. The memory 1000 stores a terminal identification (ID) serving as an example of identification information for identifying the terminal 10, a password, and the like. Every time image data and sound data that are received in performing communication with a counterpart terminal are received, the image data and sound data are overwritten in the memory 1000. Among these items of data, on the basis of image data before being overwritten, an image is displayed on the display 120, and, on the basis of sound data before being overwritten, sound is output from the speaker 115.

Note that a terminal ID in the embodiment indicates identification information such as a language, a character(s), a symbol(s), or various marks used to uniquely identify a corresponding terminal 10. In addition, a terminal ID may be identification information including a combination of at least two of the above-mentioned language, character(s), symbol(s), and various marks.

<Functional Configuration of Transmission Management System>

The transmission management system 50 includes a data transmitter/receiver 51, an authenticator 52, and a data processor 59. These elements are functions that are realized by or elements that are caused to function by any of the hardware structure illustrated in FIG. 6 that is/are caused to operate in response to a command from the CPU 201 in accordance with the management system program expanded from the HD 204 to the RAM 203. In addition, the transmission management system 50 includes a memory 5000, and the memory 5000 is configured by the HD 204 illustrated in FIG. 6.

(Authentication Management Table)

The memory 5000 stores an authentication management DB 5001, such as an authentication management table illustrated in FIG. 9. The authentication management table manages association information in which each password is associated with a corresponding one of terminal IDs of all terminals 10 managed by the transmission management system 50. For example, the authentication management table illustrated in FIG. 9 indicates that the terminal ID of the terminal 10aa is "01aa", and the password of the terminal 10aa is "aaaa".

(Functional Configuration of Transmission Management System)

Next, functional configuration of the transmission management system 50 will be described in more detail. In the following description of functional configuration of the transmission management system 50, among elements illustrated in FIG. 6, relationships with main elements for realizing functional configuration of the transmission management system 50 will be described.

The data transmitter/receiver 51 is realized by a command from the CPU 201 illustrated in FIG. 6 and by the network I/F 209 illustrated in FIG. 6, and performs transmission/reception of various types of data (or information) to/from another terminal, apparatus, or system via the communication network 2.

The authenticator 52 is realized by a command from the CPU 201 illustrated in FIG. 6, and performs terminal authentication by searching the authentication management DB 5001 of the memory 5000 by using a terminal ID and a password included in a login request received via the data transmitter/receiver 51 as search keys and determining whether the same pair of a terminal ID and a password is managed in the authentication management DB 5001.

The data processor 59 is executed by a command from the CPU 201 illustrated in FIG. 6 and the HDD 205 illustrated in FIG. 6, and performs processing to store various types of data in the memory 5000 or read various types of data stored in the non-volatile memory 5000.

<<Process or Operation>>

Next, referring to FIGS. 10 to 15, a process or an operation of managing terminals will be described. Here, operation of transmitting/receiving management information for preparation before starting communication between the terminal 10aa and the terminal 10da will be described.

FIG. 10 is a sequence diagrams illustrating operation of preparing before starting communication between transmission terminals. In this example of FIG. 10, various items of management information is transmitted or received entirely through a management information session sei.

When the user turns on the power switch 109 illustrated in FIG. 5, at S21, the operation input acceptor 12 illustrated in FIG. 7 turns on the power of the terminal 10. In response to the power on operation, at S22, the login request 13 automatically transmits a login request from the data transmitter/receiver 11 to the transmission management system 50 via the communication network 2. Accordingly, the data transmitter/receiver 51 of the transmission management system 50 receives the login request. The login request includes a terminal ID for identifying a starting terminal that can request for starting communication, such as the terminal 10aa, and a password. The terminal ID and the password are data that have been read via the data processor 19 from the memory 1000 and sent to the data transmitter/receiver 11. In the case of transmitting a login request from the terminal 10aa to the transmission management system 50, the terminal 10aa sends the IP address to the transmission management system 50, such that the transmission management system 50 can obtain the IP address of the terminal 10aa.

At S23, the authenticator 52 of the management system 50 performs terminal authentication by searching the authentication management DB 5001 (see FIG. 9) of the memory 5000 by using the terminal ID and the password included in the login request received via the data transmitter/receiver 51 as search keys, and determining whether the same terminal ID and the same password are managed in the authentication management DB 5001. In the case where the authenticator 52 determines that the login request is a login request from a terminal 10 that has a legitimate use authority since the same terminal ID and the same password are stored, at S24, the data transmitter/receiver 51 transmits sends authentication result information to the starting terminal (terminal 10aa) that sends the login request through the communication network 2. In this example, the case in which it has been determined by the authenticator 52 that the terminal 10aa is a terminal that has a legitimate use authority will be continuously described as follows.

In response to receiving the authentication result information indicating that the starting terminal is a terminal that has a legitimate use authority, the starting terminal (terminal 10aa) performs S25 to accept selection of a counterpart terminal, which will be described referring to FIGS. 10 to 15. FIG. 11 is a flowchart illustrating operation of accepting selection of a candidate counterpart terminal.

At S25-1, the candidate list generator 17 of the starting terminal 10 (terminal 10aa) generates a candidate list, based on the candidate list frame data and association information managed with the candidate list management DB 1001.

At S25-2, the display control 16 instructs the display 120 (FIG. 5) to display a candidate list screen based on the candidate list that is generated, such as the candidate list screen of FIG. 12.

The candidate list screen of FIG. 12 includes a plurality of selection regions within the candidate list frame. The selection regions are classified into first selection regions and second selection regions. The first selection regions are the first and second selection regions from the top in FIG. 12. From the left, a registration number, and the terminal ID and counterpart terminal name of a candidate counterpart terminal are displayed. The details displayed in the first selection regions reflect the details of the candidate list management table illustrated in FIG. 8. The second selection regions are the third and fourth selection regions from the top in FIG. 12. Although a registration number is displayed at the left, neither a terminal ID nor a counterpart terminal name is displayed, and what is displayed is to prompt the user to input information regarding a counterpart terminal when starting communication since a candidate counterpart terminal is unregistered. For example, in FIG. 12, two first selection regions having the registration numbers "1" and "2", which reflect the details of the candidate list management table illustrated in FIG. 8, are displayed. In addition, two second selection regions having the registration numbers "3" and "4" are displayed. In these second selection regions, "INPUT NAME AND START COMMUNICATION (UNREGISTERED)" is displayed.

In response to selection of a specific selection region by the user, at S25-3, the operation input 12 accepts the selection of a counterpart terminal indicated by the specific selection region.

At S25-4, the determiner 18 determines whether a counterpart terminal, indicated by the specific selection region received at the operation input 12, has been registered as a candidate counterpart terminal in the candidate list management table of FIG. 8. For example, the determiner 18 may use any of information such as the registration number, IP address, or counterpart name, indicated by the specific selection region, has been registered in the candidate list management table of FIG. 8.

When it is determined that the counterpart terminal has been registered ("YES" at S25-4), the operation proceeds to S25-5. At S25-5, the display control 16 causes the display 120 to display a communication start acceptance screen, such as the screen of FIG. 13, with information regarding the counterpart terminal.

The communication start acceptance screen includes an IP address field, a counterpart terminal name field, a keyboard region, a "Register candidate counterpart terminal, Start communication" key, and a "Cancel" key. The IP address field displays thereon an IP address of a counterpart terminal that the starting terminal 10 requests to start communication, which is selected from a list of candidate counterpart terminals, or allows the user at the starting terminal 10 to input an IP address of the counterpart terminal. The counterpart terminal name field displays thereon a name of the counterpart terminal, or allows the user at the starting terminal 10 to input the name of the counterpart terminal.

At S25-5, since it is determined that the counterpart terminal, indicated by the specific selection region, has been registered, the screen of FIG. 13 displays the IP address of the counterpart terminal in the IP address field, and the counterpart name of the counterpart terminal in the counterpart terminal name field. For example, assuming that the selection region indicated by the region number "1" of FIG. 12 is selected at S25-3, the screen of FIG. 13 displays the IP address "1.2.1.4" in the IP address field, and "Mr. Ricoh, General manager" in the counterpart terminal name field.

In response to selection of the "Register candidate counterpart terminal, Start communication" key by the user, the operation proceeds to S25-6.

At S25-6, the data processor 19 of the starting terminal 10 registers the counterpart terminal, and accepts a request for starting communication with the counterpart terminal.

More specifically, the data processor 19 of the starting terminal 10 (terminal 10aa) registers the IP address being displayed on the IP address field, and the counterpart terminal name being displayed on the counterpart terminal name field, to the candidate list management table of FIG. 8 as a record for a candidate counterpart terminal having the registration number "1" that is selected at S25-3. In this example, data previously stored in the candidate list management table of FIG. 8 is overwritten with data being displayed on the screen of FIG. 13 at the time when the user selects the "Register candidate counterpart terminal, Start communication" key.

At S25-5, when the "Cancel" key is selected by the user, the operation ends without performing S25-6. Alternatively, the operation may return to S25-2.

Referring back to S25-4, when it is determined that the counterpart terminal, indicated by the specific selection region, has not been registered as a candidate counterpart terminal ("NO" at S25-4), the operation proceeds to S25-7.

At S25-7, the display control 16 causes the display 120 to display a communication start acceptance screen, such as the screen of FIG. 13, without information regarding the counterpart terminal.

Since there is no information regarding the counterpart terminal is available, the IP address field and the counterpart terminal name field are left blank. In this example, it is assumed that the user selects the selection region with the registration number "3" as illustrated in FIG. 12. In order to start communication with the counterpart terminal 10 (terminal 10da), the user at the starting terminal 10 (terminal 10aa) inputs the IP address "1.3.2.3" of the terminal 10da in the IP address field, and the counterpart terminal name "President" in the counterpart terminal name field, using the keyboard being displayed, as illustrated in FIG. 13. The user may input any character, numeral, or mark, as a counterpart terminal name, so that the user can easily manage or remember.

At S25-8, the operation input 12 receives the IP address and the counterpart terminal name, which are input by the user.

At S25-6, the data processor 19 of the starting terminal 10 registers the counterpart terminal, and accepts a request for starting communication with the counterpart terminal.

More specifically, the data processor 19 of the starting terminal (terminal 10aa) registers the IP address that is input on the IP address field, and the counterpart terminal name that is input on the counterpart terminal name field, to the candidate list management table of FIG. 8 as a record for a candidate counterpart terminal having the registration number "3" that is selected at S25-3. In this example, the IP address "1.2.3.2" and the counterpart terminal name "President" are newly registered in the record for the registration number "3".

In this manner, in response to selection of the "Register candidate counterpart terminal, Start communication" key by the user, the data processor 19 registers the IP address and the counterpart terminal name, which is input or displayed on the screen, to the candidate list management table of FIG. 8 as a candidate counterpart terminal. At the same time, the data processor 19 requests to start communication with the counterpart terminal having the IP address being input or displayed.

Accordingly, in the case of registering the terminal 10da as a candidate counterpart terminal as described above, the display control 16 of the terminal 10aa causes the display 120aa to display a candidate list screen of FIG. 15 with information regarding the candidate counterpart terminal 10da. In the candidate list screen of FIG. 15, the selection region with the registration number "3" now becomes the first selection region, which is displayed with the IP address and the counterpart terminal name. When the selection region with the registration number "3" is selected at S25-3, the operation proceeds to S25-5 based on determination at S25-4 that the counterpart terminal is registered.]

After the operation of S25 ends, the operation further proceeds to S26 of FIG. 10.

At S26, the data transmitter/receiver 11 transmits a communication start request, which requests to start communication with the counterpart terminal, to the transmission management system 50 through the communication network 2. The communication start request includes the IP address of the counterpart terminal, which is registered at S25-6 of FIG. 11, and the IP address of the terminal 10aa.

At S27, the data transmitter/receiver 51 transmits a communication start request, which requests to start communication with the starting terminal 10aa, to the counterpart terminal 10da having the counterpart terminal IP address received from the starting terminal 10aa. In this manner, a communication session is established between the terminal 10aa and the counterpart terminal 10da.

Note that the above-mentioned IP addresses are examples of counterpart terminal information, and besides the IP addresses, the counterpart terminal information includes a host name.

As described above, in one aspect of the present invention, the terminal 10 receives a user input of address information indicating a location of the counterpart terminal on the communication network (S25-8). In response to the user input, the terminal 10 starts communicating with the counterpart terminal using the address information that is input (S26). Further, in response to the user input, the terminal 10 stores the address information that is input, in the memory 1000 (S25-6), as a candidate counterpart terminal for the terminal 10. Accordingly, the address information input by the user is used, not only to start communication with the counterpart terminal, but to register the counterpart terminal as a candidate counterpart terminal for the terminal 10. Since the counterpart terminal 10 is automatically registered in the memory 1000, the user at the terminal 10 does not have to register the counterpart terminal as a candidate counterpart terminal in prior to starting communication, for example, for the next time.

For example, the address information of the counterpart terminal and the communication start request may be received as one user input. In response to the user input, the terminal 10 is able to collective perform registration of the counterpart terminal as a candidate counterpart terminal, and starting communication with the counterpart terminal using the address information, according to the user input, operability for the user improved.

In one aspect of the present invention, the terminal 10 causes the display 120 to display a screen including a first selection region having address information of the candidate counterpart terminals displayed thereon, and a second selection region having no address information regarding the candidate counterpart terminals thereon. The terminal 10 receives user selection of the first selection region or the second selection region (S25-3). In response to user selection of the second selection region, the terminal 10 causes the display 120 to display a screen that requests a user to input at least the address information of the counterpart terminal (S25-7). The terminal 10 receives the user input of the address information of the counterpart terminal (S25-8). With the screen that requests the user to input the address information, the user can easily recognize the need for inputting the address information of the counterpart terminal.

In one aspect of the present invention, the terminal 10 further receives a user input of the counterpart name information of the counterpart terminal (S25-8). The terminal 10 stores the address information and the counterpart name information of the counterpart terminal, in association with each other, in the memory 1000 (S25-6). With registration of the counterpart name, the counterpart name is displayed on the candidate list screen, for example, when the user tries to select a counterpart terminal through the candidate list screen. With the counterpart name being displayed, the user can easily select a desired counterpart terminal that the user wants to start communication with.

As described above, in one aspect of the present invention, the transmission terminal receives a user input of counterpart terminal address information indicating a location of a counterpart terminal on a network, and starts communication with the counterpart terminal using the counterpart terminal address information. The transmission terminal further stores the counterpart terminal address information in a memory, as a candidate counterpart terminal for the terminal that receives the use input. Accordingly, communication is started with the counterpart terminal using the counterpart terminal address information that is input by the user, but also that counterpart terminal address information is stored in a memory. Thus, the next time the user wants to start communication with the counterpart terminal, the user only needs to select the candidate counterpart terminal information in the memory, without requiring input of the counterpart terminal address information, thus increasing operability for the user.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

The relay devices 30, the management system 50, the transmission terminal management system 80, the program providing system 90, and the maintenance system 100 in the above-described embodiment may be configured by a single computer or a plurality of computers to which divided elements (functions) are arbitrarily allocated. In the case where the program providing system 90 is configured by a single computer, a program transmitted by the program providing system 90 may be separately transmitted in units of a plurality of modules, or may be transmitted in its entirety. Further, in the case where the program providing system 90 is configured by a plurality of computers, a program may be divided into a plurality of modules, and the modules may be individually transmitted from the respective computers.

Further, a recording medium storing the terminal program, relay device program, transmission management program, or transmission terminal management system program in the above-described embodiment, the HD 204 storing these programs, and the program providing system 90 including the HD 204 are used in the case where they are provided as program products at home or abroad to the users of the above-described terminal program, relay device program, transmission management program, and transmission terminal management system program.

Further, although the case of a videoconference system has been described as an example of the transmission system 1 in the above-described embodiment, the embodiment is not limited to this case, and the transmission system 1 may be a phone system such as an Internet Protocol (IP) phone system or an Internet phone system. In addition, the transmission system 1 may be a car navigation system. In this case, for example, one of two terminals 10 corresponds to a car navigation apparatus mounted on a car, and the other terminal 10 corresponds to a management terminal or a management server of a management center that manages car navigation, or a car navigation apparatus mounted on another car.

Further, the transmission system 1 may be a cellular phone communication system. In this case, for example, the terminals 10 correspond to cellular phones.

Further, although image data serving as sight data and sound data serving as hearing data are described as examples of content data in the above-described embodiment, the content data is not limited to these items of data, and the content data may be other five-sense data. For example, in the case where the content data is touch data, a sensation obtained by a user's contact at one terminal side is transmitted to the other terminal side. Further, in the case where the content data is smell data, a smell at one terminal side is transmitted to the other terminal side. In the case where the content data is taste data, a taste at one terminal side is transmitted to the other terminal side.

Further, it is sufficient for the content data to be at least one of image (sight) data, sound (hearing) data, touch data, smell data, and taste data.

In addition, although the case in which a videoconference is held by the transmission system 1 has been described in the above-described embodiment, the embodiment is not limited to this case. The transmission system 1 may be used in meetings, general conversations between family members or friends, or one-way presentation of information.

Further, any of the above-described devices or units can be implemented as a hardware apparatus, such as a special-purpose circuit or device, or as a hardware/software combination, such as a processor executing a software program.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. A transmission terminal, comprising:
a memory configured to store, for each one of a plurality of candidate counterpart terminals with which the transmission terminal is capable of communicating, address information indicating at least a location of the candidate counterpart terminal on a network;
a user interface configured to receive a user input of address information of a counterpart terminal, and a communication start request that requests to start communication with the counterpart terminal;
processing circuitry configured to store, in the memory, the address information of the counterpart terminal received at the user interface, to register the counterpart terminal as a candidate counterpart terminal for the terminal; and
a transmitter configured to send a request to start communication with the counterpart terminal using the address information of the counterpart terminal that is received at the user interface,
wherein the user interface is further configured to cause a display to display a candidate list screen having a first selection region that lists one or more candidate counterpart terminals previously registered in the memory, and a second selection region having no terminal information, and
when the user interface receives a user instruction selecting either of the first or second selection regions, the user interface displays a same screen that requests a user to register a counterpart terminal, wherein when the user instruction selects the first selection region, an address field in the screen is automatically filled in with an address of the selected counterpart terminal, and when the user instruction selects the second selection region, the address field in the screen is blank;
wherein the user interface displays the screen, which includes:
an entry field that allows the user to input the address information of the selected counterpart terminal; and
a communication start key that allows the user to request to start communication with the selected counterpart terminal,
wherein, in response to selection of the communication start key, the user interface receives the address information and the communication start request at a same time, as one user input.

2. The transmission terminal of claim 1, wherein, the memory further stores counterpart name information indicating a counterpart name assigned to each one of the plurality of candidate counterpart terminals, in association with the address information, and the user interface further receives input counterpart name information indicating a name assigned to the counterpart terminal,
the processing circuitry further stores the input counterpart name information of the counterpart terminal received at the user interface in the memory in association with the address information of the counterpart terminal.

3. The transmission terminal of claim 1,
wherein, in response to user selection of the second selection region, the user interface determines that the user instruction for selecting an unregistered terminal is received.

4. A method of managing information regarding a transmission terminal, comprising:
storing in a memory, for each one of a plurality of candidate counterpart terminals with which the transmission terminal is capable of communicating, address information indicating at least a location of the candidate counterpart terminal on a network;
receiving, at a user interface, a user input of address information of a counterpart terminal, and a communication start request that requests to start communication with the counterpart terminal;
storing, in the memory, the address information of the counterpart terminal that is received, to register the counterpart terminal as a candidate counterpart terminal for the terminal; and
sending a request to start communication with the counterpart terminal using the received address information of the counterpart terminal,
wherein the user interface is further configured to cause a display to display a candidate list screen having a first selection region that lists one or more candidate counterpart terminals previously registered in the memory, and a second selection region having no terminal information, and
when the user interface receives a user instruction selecting either of the first or second selection regions, the user interface displays a same screen that requests a user to register a counterpart terminal, wherein when the user instruction selects the first selection region, an address field in the screen is automatically filled in with an address of the selected counterpart terminal, and when the user instruction selects the second selection region, the address field in the screen is blank;
wherein the screen includes:
an entry field that allows the user to input the address information of the selected counterpart terminal; and
a communication start key that allows the user to request to start communication with the selected counterpart terminal, the method comprising:
in response to selection of the communication start key, receiving the address information and the communication start request at a same time, as one user input.

5. The method of claim 4, further comprising:
storing counterpart name information indicating a counterpart name assigned to each one of the plurality of candidate counterpart terminals, in association with the address information;
receiving input counterpart name information indicating a name assigned to the counterpart terminal; and
storing the input counterpart name information of the counterpart terminal that is received in the memory in association with the address information of the counterpart terminal.

6. The method of claim 4, the method further comprising:
in response to receiving a user selection of the second selection region, determining that the user instruction for selecting an unregistered terminal is received.

7. A non-transitory recording medium which, when executed by processing circuitry, causes the processing circuitry to perform a method of managing information regarding a transmission terminal, the method comprising:
storing in a memory, for each one of a plurality of candidate counterpart terminals with which the transmission terminal is capable of communicating, address information indicating at least a location of the candidate counterpart terminal on a network;
receiving, at a user interface, a user input of address information of a counterpart terminal, and a communication start request that requests to start communication with the counterpart terminal;
storing, in the memory, the address information of the counterpart terminal that is received, to register the counterpart terminal as a candidate counterpart terminal for the terminal; and
sending a request to start communication with the counterpart terminal using the received address information of the counterpart terminal,
wherein the user interface is further configured to cause a display to display a candidate list screen having a first selection region that lists one or more candidate counterpart terminals previously registered in the memory, and a second selection region having no terminal information, and
when the user interface receives a user instruction selecting either of the first or second selection regions, the user interface displays a same screen that requests a user to register a counterpart terminal, wherein when the user instruction selects the first selection region, an address field in the screen is automatically filled in with an address of the selected counterpart terminal, and when the user instruction selects the second selection region, the address field in the screen is blank;
wherein the screen includes:
an entry field that allows the user to input the address information of the selected counterpart terminal; and
a communication start key that allows the user to request to start communication with the selected counterpart terminal, the method comprising:
in response to selection of the communication start key, receiving the address information and the communication start request at a same time, as one user input.

* * * * *